United States Patent
Wang et al.

(10) Patent No.: US 8,093,540 B2
(45) Date of Patent: Jan. 10, 2012

(54) METHOD OF FOCUS AND AUTOMATIC FOCUSING APPARATUS AND DETECTING MODULE THEREOF

(75) Inventors: Yung-Hsing Wang, Taichung (TW); Kun-Wei Lin, Tainan County (TW); Pin-Hao Hu, Kaohsiung (TW); Chia-Chao Chung, Hsinchu County (TW); Yu-Sheng Liu, Tainan County (TW)

(73) Assignee: Industrial Technology Research Institute, Hsinchu (TW)

( * ) Notice: Subject to any disclaimer, the term of this patent is extended or adjusted under 35 U.S.C. 154(b) by 383 days.

(21) Appl. No.: 12/422,948

(22) Filed: Apr. 13, 2009

(65) Prior Publication Data
US 2010/0116968 A1 May 13, 2010

(30) Foreign Application Priority Data

Nov. 12, 2008 (TW) ............................... 97143748 A

(51) Int. Cl.
*G02B 27/40* (2006.01)
(52) U.S. Cl. ................... 250/201.1; 250/201.2
(58) Field of Classification Search ............ 250/201.2; 359/368–390, 738–740
See application file for complete search history.

(56) References Cited

U.S. PATENT DOCUMENTS

| 4,639,587 | A | * | 1/1987 | Chadwick et al. | ......... 250/201.3 |
| 4,758,088 | A | * | 7/1988 | Doyle | ........................... 356/451 |
| 6,259,057 | B1 | | 7/2001 | Lai | |
| 7,298,549 | B2 | | 11/2007 | Muller | |

FOREIGN PATENT DOCUMENTS

| JP | 1997-269298 | 10/1997 |
| JP | 11-230823 | 8/1999 |
| JP | 1999-230823 | 8/1999 |
| JP | 2001-150171 | 6/2001 |

OTHER PUBLICATIONS

"First Office Action of China Counterpart Application", issued on Nov. 29, 2010, p. 1-p. 5.
"Office Action of Taiwan Counterpart Application", issued on Jul. 14, 2011, p. 1-p. 5.

\* cited by examiner

*Primary Examiner* — Tony Ko
(74) *Attorney, Agent, or Firm* — Jianq Chyun IP Office

(57) ABSTRACT

A method of focus and a focusing apparatus and a detecting module are provided. The detecting module includes an ellipse curved-surface reflection device and a light detector. The ellipse curved-surface reflection device has a beam gate, a first focus and a second focus. A light beam is focused by a light focusing device, and is projected on a surface of an object to be detected through the beam gate. The ellipse curved-surface reflection device reflects the light beams reflected or scattered by the object. The light detector is disposed on the second focus for receiving the light beam reflected by the ellipse curved-surface reflection device to generate a detecting result, by which a distance between the light focusing device and the surface of the object to be detected is adjusted, so that the light beam is correctly focused on the surface of the object.

18 Claims, 7 Drawing Sheets

METHOD OF FOCUS AND AUTOMATIC FOCUSING APPARATUS AND DETECTING MODULE THEREOF

CROSS-REFERENCE TO RELATED APPLICATION

This application claims the priority benefit of Taiwan application serial no. 97143748, filed on Nov. 12, 2008. The entirety of the above-mentioned patent application is hereby incorporated by reference herein and made a part of specification.

BACKGROUND

1. Technical Field

The disclosure relates to a focusing apparatus. More particularly, the disclosure relates to a method of focus that can detect and adjust a focus position, and a focusing apparatus and a detecting module thereof.

2. Description of Related Art

With booming development of the electronic industry, a market trend for a plenty of consumable electronic products (for example, mobile phones, cameras, projectors) is delicacy and miniaturization. To match such a trend of the electronic industry, machining methods for key parts of the consumable electronic products are essential. On the other hand, a plurality of micron process machining is also applied to fabrication processes of current solar cells or panels, for example, micro-circuit repairing, micro-machining, cutting, welding, drilling, material modification, etc. Therefore, the former mechanical machining methods are gradually inapplicable due to limitation of a blade size and a mechanism thereof.

A current solution is to perform the machining through a high-precision and high speed laser, for example, laser drilling and laser cutting, etc. The precision of the laser machining can be influenced due to an uneven surface of a machining part, of which a focal point of the laser may depart from a machining surface during the processing, which may lead to a malfunction of the machining due to insufficient energy of the laser, or an error of a machining size due to an excessive light spot area. Therefore, an automatic focusing module has to be applied to achieve the precision machining.

FIG. 1 is a diagram illustrating an automatic focusing structure of a laser engraving machine disclosed by a U.S. Pat. No. 6,259,057B1. Referring to FIG. 1, the conventional laser engraving machine 100 applies a mechanical probe 101 to detect whether the laser is focused, and achieves an automatic focusing function by adjusting the laser beam according to a detection result. However the mechanical probe 101 has to directly contact the surface of the machining part for detecting, and such detecting method generally causes a damage or contamination of the surface of the machining part, and limited by the mechanical structure, a precision thereof cannot be effectively improved, so that the machining apparatus applying such detecting method is not accord to a standard of a current micro-machining process.

FIG. 2 is a structural diagram illustrating a microscope disclosed by a U.S. Pat. No. 7,298,549B2. Referring to FIG. 2, to improve the machining precision, a current machining machinery generally applies an optical automatic focusing method to substitute the mechanical focusing method, and a common automatic focusing type is a confocal optical focusing. Generally, the confocal optical focusing requires relatively more optical devices (for example, a spectroscope 201, a filter 202, a focus lens 203 and optical lenses 204, 205, etc.) to guide the light to a detector 210, so as to detect whether the light is focused. Moreover, according to such automatic focusing method, a defocus direction cannot be directly identified, and the focusing lens 203 has to be shifted for a distance to identify whether the machining part is in a front focus state or a back focus state. Therefore, such focusing method may lead to problems of high cost and a great size.

SUMMARY

The disclosure is directed to a detecting module capable for judging whether a focus is located at a suitable position, so as to determine a deviating position and a deviating distance of the focus.

The disclosure is directed to an automatic focusing apparatus having a detecting module capable for judging whether a focus is located at a suitable position, and the automatic focusing apparatus can automatically adjust the focus to the suitable position.

The disclosure is directed to a method for judging whether a focus is located at a suitable position, by which the focus can be automatically adjusted to the suitable position.

The disclosure provides a detecting module, suitable for detecting a defocus state of a focused light beam projected to a surface of an object to be detected, and a focus position thereof. The detecting module includes an ellipse curved-surface reflection device and a light detector. The ellipse curved-surface reflection device has a beam gate, wherein the focused light beam is projected to the surface of the object to be detected through the beam gate to generate a reflected light beam and a scattered light beam. The light detector is used for detecting the reflected light beam and the scattered light beam reflected by the ellipse curved-surface reflection device to generate a detecting result. The focus position of the focused light beam is adjusted according to the detecting result, so that the focus position falls on the surface of the object to be detected.

The disclosure provides an automatic focusing apparatus including a light focusing device, a light detector, an ellipse curved-surface reflection device having a beam gate, a data processing device, an actuator and an adjustment unit. The light focusing device focuses a detecting light beam into a focused light beam having a focus, and the focused light beam can be projected to an object to be detected to generate a reflected light beam and a scattered light beam. The light detector is used for detecting a light signal. The ellipse curved-surface reflection device is disposed between the light focusing device and the object to be detected, and enabling the focused light beam be projected to the object to be detected through the beam gate. Meanwhile, the ellipse curved-surface reflection device guides the reflected light beam and the scattered light beam scattered by the object to be detected to the light detector. The data processing device is used for analysing a signal received by the light detector to determine whether the object to be detected is focused. Meanwhile, the data processing device also computes a control signal with a defocus state required to be modified, and transmits the control signal to the actuator. The actuator is coupled to the adjustment unit, and generates a driving signal to the adjustment unit according to the control signal. The adjustment unit is coupled to the light focusing device, the ellipse curved-surface reflection device and the light detector, respectively, and is capable of simultaneously moving the three devices towards a same direction.

The disclosure provides a method of focusing, which can be described as follows. A detecting light beam is focused into a focused light beam having a focus, and is projected to an object to be detected to generate a reflected light beam and a scattered light beam. The reflected light beam and the scattered light beam are guided to a focus of an ellipse curved-surface based on reflection of the ellipse curved-surface, and are sensed to generate a sensing signal, and whether the focus of the focused light beam is located on a surface of the object to be detected is judged according to the sensing signal.

In order to make the aforementioned and other objects, features and advantages of the disclosure comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The disclosure provides a detecting module with a simple structure and capable for judging whether a focus is located at a suitable position, so as to determine a deviating position and a deviating distance of the focus. A focusing apparatus is formed based on the detecting module, which can automatically adjust the focus to the suitable position. Therefore, the focusing apparatus can judge a deviating direction of the focus of the light beam, so as to adjust the position of the focus.

Figure 1:
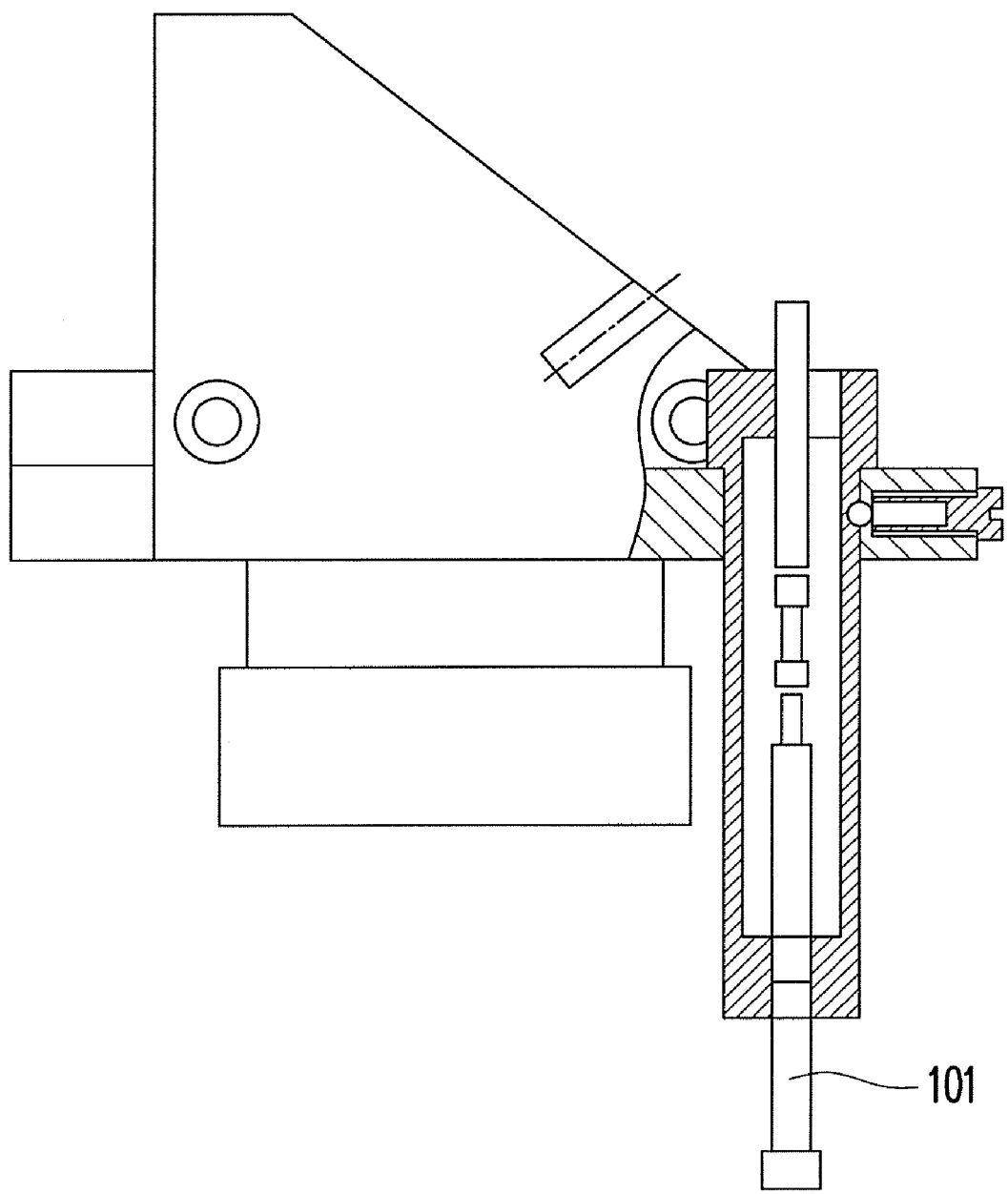
FIG. 1 is a diagram illustrating an automatic focusing structure of a laser engraving machine disclosed by a U.S. Pat. No. 6,259,057B1.
Figure 2:
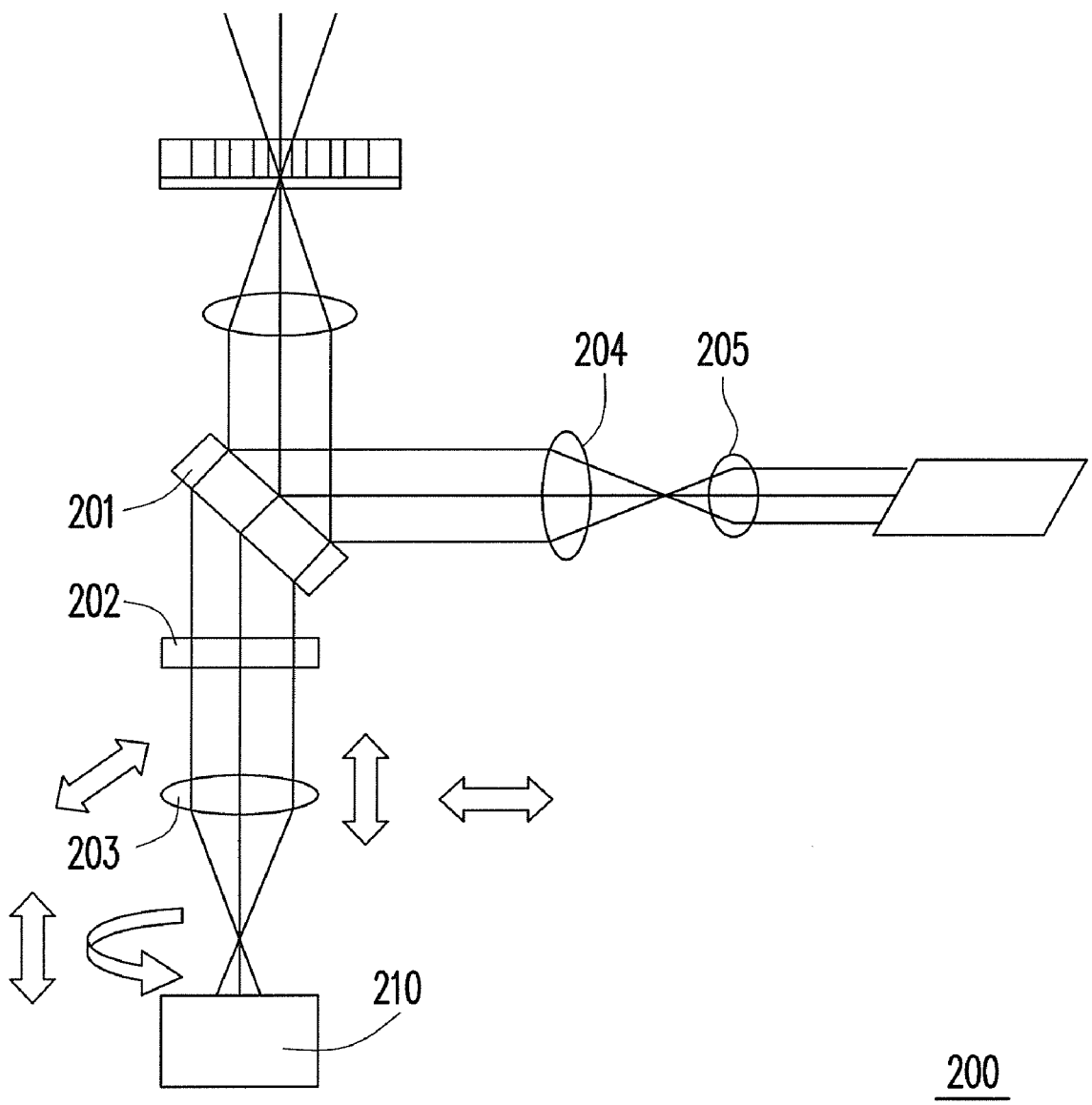
FIG. 2 is a structural diagram illustrating a microscope disclosed by a U.S. Pat. No. 7,298,549B2.
Figure 3:
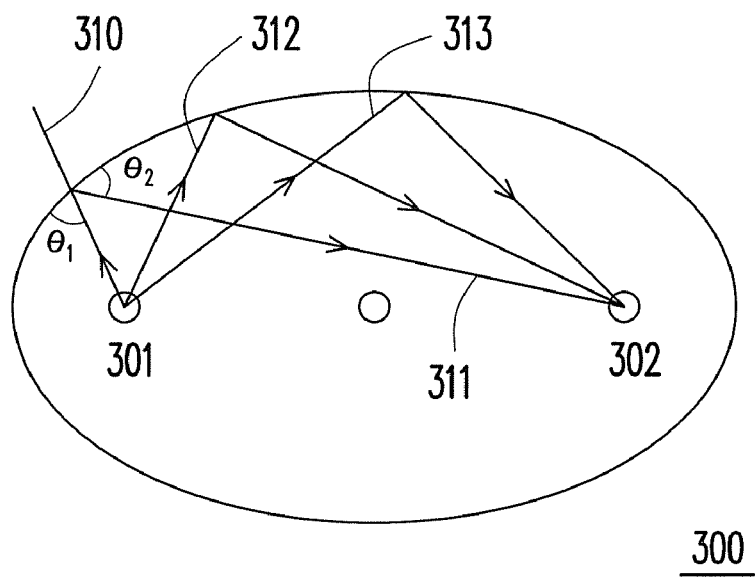
FIG. 3 is a planar diagram of an ellipse.

Before embodiments of the disclosure are described, some concepts of the disclosure are explained first. FIG. 3 is a planar diagram of an ellipse. Referring to FIG. 3, according to a graph theory, the ellipse 300 has two conjugate foci 301 and 302, if a line (for example, the line 310) is extended from the focus 301 and crosses the ellipse 300, a cross point thereof and the focus 302 form another line (for example, the line 311). The lines 310 and 311 respectively form angles $\theta_1$ and $\theta_2$ with the ellipse 300, and the angle $\theta_1$ is equal to the angle $\theta_2$. According to a characteristic of the ellipse, lines formed between any point on the ellipse 300 and the two foci 301 and 302 have the above characteristic. Accordingly, if the ellipse 300 is a reflection device, and the focus 301 is a light source, the light beam emitted from the focus 301 is reflected by the ellipse curved-surface reflection device 300, and must pass through the focus 302 of the ellipse curved-surface reflection device 300. Moreover, the light beams 312 and 313 emitted from the focus 301 are reflected by the ellipse curved-surface reflection device 300, and are crossed at the focus 302 (i.e. are focused at the focus 302). According to such concepts, a detecting module capable for detecting whether the light beam is focused at a correct position can be provided.

Figure 4:
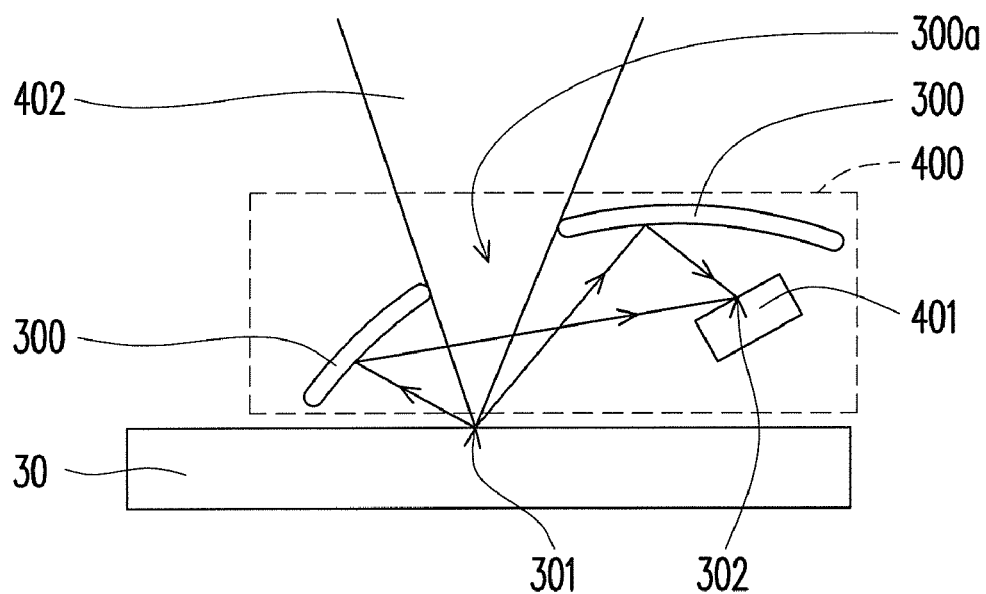
FIG. 4 is a cross-sectional view of a detecting module 400 according to an embodiment of the disclosure.

FIG. 4 is a cross-sectional view of a detecting module 400 according to an embodiment of the disclosure. Referring to FIG. 4, the detecting module 400 includes the ellipse curved-surface reflection device 300 and a light detector 401, wherein the ellipse curved-surface reflection device 300 is formed by a part of the ellipse, and a material thereof is, for example, a metal material or a glass material coated with a reflective material, such as a reflective film, etc. The ellipse curved-surface reflection device 300 has a beam gate 300a. A light beam 402 focused by a light focusing device passes through the beam gate 300a, and is focused on the focus 301 of the ellipse curved-surface reflection device 300. A point on a surface of an object 30 has to be coincident to the focus 301, and such point is the correct position for the focus of the focused light beam 402. However, during actual applications, the focused light beam 402 is not easy to be directly focused onto the predetermined position, so that the detecting module 400 of the present embodiment is applied to adjust the focus position of the focused light beam 402. The focused light beam 402 can be a light beam emitted from a single-wavelength light source or a multi-wavelength light source, for example, a light-emitting diode (LED), an incandescent light source, a laser light source or other types of the light source, etc.

The light detector 401 is located at another focus 302 of the ellipse curved-surface reflection device 300, i.e. the conjugate focus of the focus 301.

When the focused light beam 402 (for example, a laser beam) is projected to such point (i.e. the focus 301) on the surface of the object 30 through the beam gate 300a, the laser beam 402 can be reflected and scattered by the object 30, and the reflected light beam or the scattered light beam are reflected to the light detector 401 located at the focus 302 by the ellipse curved-surface reflection device 300. Next, the light detector 401 receives the reflected light beam or the scattered light beam to generate a detection result, wherein the detection result includes a light intensity distribution and a size of a light type.

The light detector 401 can be a photoelectric position sensitive device (PSD), a charge-coupled device (CCD), a complementary metal-oxide-semiconductor (CMOS) device, a photon diode, a photon diode array or other light detectors, though the disclosure is not limited thereto. The CCD includes at least an array composed of a plurality of charge-coupled units. The CMOS device also includes an array composed of a plurality of complementary metal-oxide-semiconductor cells.

Figure 5A:
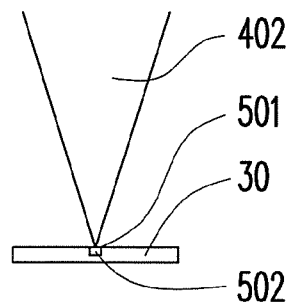
FIG. 5A is an amplified schematic diagram illustrating a laser beam of FIG. 4 focused on an object.
Figure 5B:
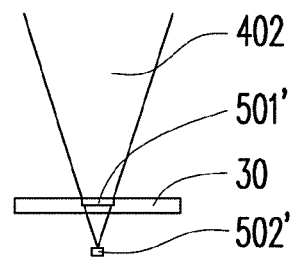
FIG. 5B is an amplified schematic diagram illustrating a laser beam of FIG. 4 focused behind an object.
Figure 5C:
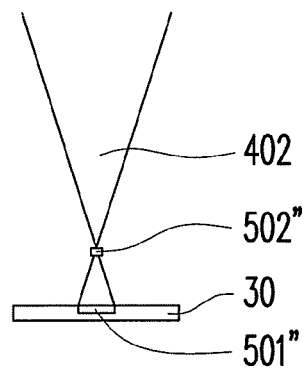
FIG. 5C is an amplified schematic diagram illustrating a laser beam of FIG. 4 focused in front of an object.
Figure 6A:
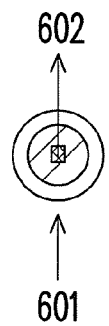
FIG. 6A is a schematic diagram illustrating a detection result when a laser beam 402 of FIG. 4 is focused on an object.
Figure 6B:
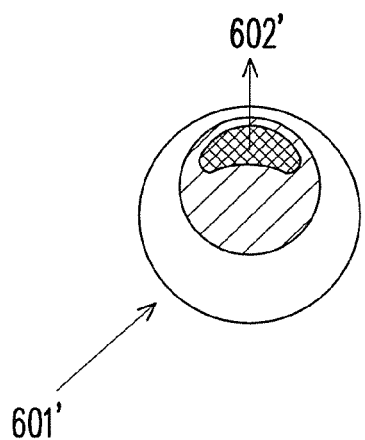
FIG. 6B is a schematic diagram illustrating a detection result when a laser beam of FIG. 4 is focused behind an object.
Figure 6C:
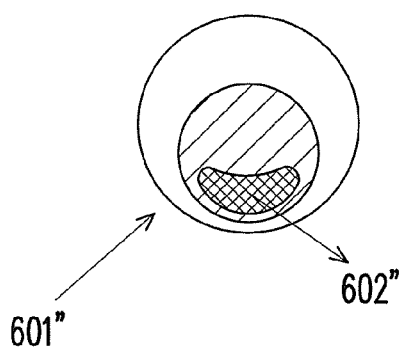
FIG. 6C is a schematic diagram illustrating a detection result when a laser beam of FIG. 4 is focused in front of an object.

The light detector 401 may generate different detection results according to different focus positions of the laser beam 402 and different positions of the focus 301, and whether the laser beam 402 is focused at the correct position can be judged according to the detection result. The focus position of the laser beam 402 is described with reference of a following figure. FIG. 5A is an enlarged schematic diagram illustrating the laser beam 402 of FIG. 4 focused on the object 30. FIG. 5B is an enlarged schematic diagram illustrating the laser beam 402 of FIG. 4 focused behind the object 30. FIG. 5C is an enlarged schematic diagram illustrating the laser beam 402 of FIG. 4 focused in front of the object 30. FIG. 6A is a schematic diagram illustrating a detection result when the laser beam 402 of FIG. 4 is focused on the object 30. FIG. 6B is a schematic diagram illustrating a detection result when the laser beam 402 of FIG. 4 is focused behind the object 30. FIG. 6C is a schematic diagram illustrating a detection result when the laser beam 402 of FIG. 4 is focused in front of the object 30. Wherein, when the laser beam 402 is focused behind the object 30, it is referred to as that the object 30 is in a front focus state, and when the laser beam 402 is focused in front of the object 30, it is referred to as that the object 30 is in a back focus state.

Referring to FIG. 5A and FIG. 6A, when the laser beam 402 is projected to the surface of the object 30, a spot area 501 is formed on the object 30. When the laser beam 402 is correctly focused on the object 30, so that the focus position 502 of the laser beam 402 is located on the surface of the object 30, the spot area 501 may have a minimum value. According to the above concept, all of the reflected light beams and the scattered light beams are reflected to the other focus 302 by the ellipse curved-surface reflection device 300. Now, the light detector 401 detects the reflected light beams and the scattered light beams reflected by the ellipse curved-surface reflection device 300, and generates a detection result shown as a light intensity distribution of FIG. 6A. Now, a size of a light type 601 is the minimum, and a peak 602 of the light intensity distribution is located at a center of the figure, which represents that the laser beam 402 is correctly focused on the surface of the object 30.

Besides, if the focus of the laser beam 402 falls behind the surface of the object 30, the object 30 is in the front focus state, namely, the object 30 is located in front of the focus of the laser beam 402. Now, the light detector 401 can generate a different detection result, by which the position of the object 30 can be judged. Referring to FIG. 5B and FIG. 6B, the farther a focus position 502' of the laser beam 402 is departed from the surface of the object 30, the greater a spot area 501' is. Now, after the reflected light beam and the scattered light beam of the laser beam 402 are reflected by the ellipse curved-surface reflection device 300, they do not necessarily pass through the focus 302. Namely, the reflected light beam and the scattered light beam are not again focused on the focus 302 after being reflected by the ellipse curved-surface reflection device 300, so that the light detector 401 generates a detection result shown as that in FIG. 6B. Now, the size of the light type 601' directly relates to a distance between the focus position 502' of the laser beam 402 and the surface of the object 30, and the peak 602' of the light intensity distribution is located on the top of the figure, which represents that the focus of the laser beam 402 falls behind the surface of the object 30, so that the object 30 is located in front of the focus.

Similarly, if the focus of the laser beam 402 falls in front of the surface of the object 30, the object is in the back focus state, namely, the object 30 is located behind the focus of the laser beam 402. Now, the light detector 401 generates a different detection result, by which the position of the object 30 can be judged. Referring to FIG. 5C and FIG. 6C, similarly, the farther a focus position 502" of the laser beam 402 is departed from the surface of the object 30 (here, the focus of the laser beam 402 is located in front of the surface of the object 30), the greater a spot area 501" is. Now, after the reflected light beam and the scattered light beam of the laser beam 402 are reflected by the ellipse curved-surface reflection device 300, they do not necessarily pass through the focus 302. Namely, the reflected light beam and the scattered light beam are not again focused on the focus 302 after being reflected by the ellipse curved-surface reflection device 300, so that the light detector 401 generates a detection result shown as that in FIG. 6C. Now, the size of the light type 601" directly relates to a distance between the focus position 502" of the laser beam 402 and the surface of the object 30, and the peak 602" of the light intensity distribution is located at the bottom of the figure, which represents that the focus of the laser beam 402 falls in front of the surface of the object 30, so that the object 30 is located behind the focus.

Therefore, the detecting module 400 can determine whether the laser beam 402 is correctly focused on the surface of the object 30 according to the peak position of the light intensity distribution and the size of the light type. Moreover, the focus position and a defocus direction of the laser beam 402 relative to the surface of the object 30, and the distance between the focus position of the laser beam 402 and the surface of the object 30 can be obtained according to the peak position of the light intensity distribution and the size of the light type.

Figure 7A:
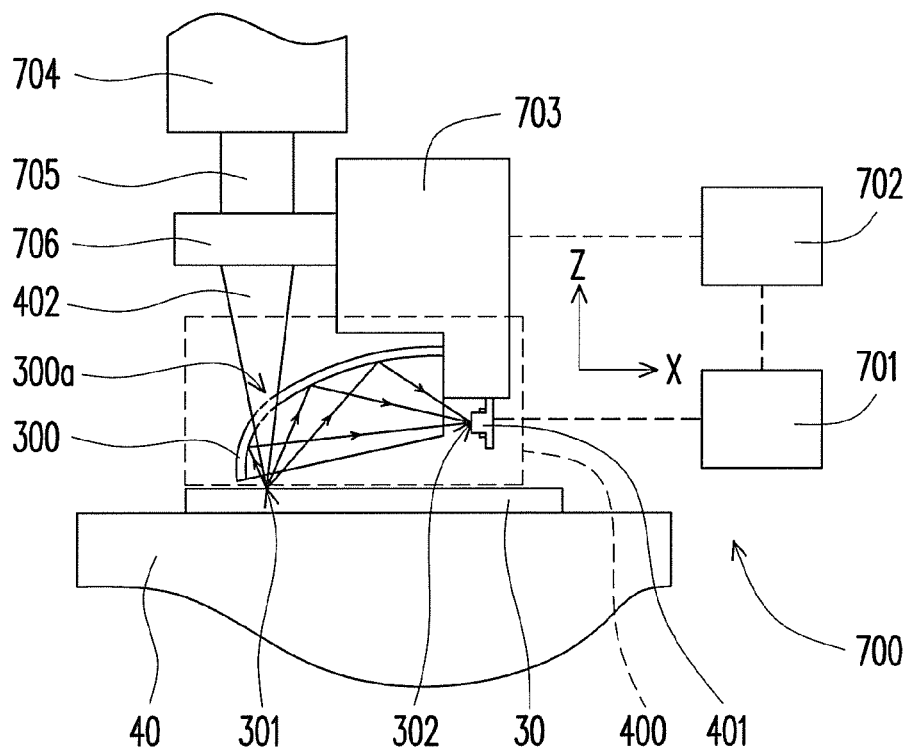
FIGS. 7A-7C are structural diagrams illustrating different focusing apparatus according to the embodiment of FIG. 4.

Moreover, an automatic focusing apparatus is provided according to the above embodiment. FIG. 7A is a structural diagram illustrating a focusing apparatus according to the embodiment of FIG. 4. Referring to FIG. 4 and FIG. 7A, the focusing apparatus 700 includes a detecting module 400, a data processing unit 701, an actuator 702, an adjustment unit 703, a light source 704 and a light focusing device 706. A structure of the detecting module 400 and an operation method thereof are described in the aforementioned embodiment, and therefore detailed description thereof is not repeated. The data processing unit 701 is, for example, an embedded controller coupled to the light detector 401 of the detecting module 400 to generate a control signal to the actuator 702 according to the detection result. The actuator 702 is coupled to the adjustment unit 703, and generates a driving signal to the adjustment unit 703 according to the control signal, wherein the driving signal can be a digital signal or an analog signal.

The adjustment unit 703 is, for example, a motor coupled to the light focusing device 706, the ellipse curved-surface reflection device 300 and the light detector 401, and is used for adjusting positions of the light focusing device 706, the ellipse curved-surface reflection device 300 and the light detector 401 in a Z-axis direction according to the driving signal, wherein the adjustment unit 703 has to correspond to a form of the driving signal, so as to be operated in response to the driving signal. The light source 704 provides a light beam 705, and the light focusing device 706 is, for example, a convex lens, and is used for focusing the light beam 705, so as to form the focused light beam 402. Meanwhile, the focus of the focused light beam 402 is coincident to the focus 301 of the ellipse curved-surface reflection device 300. The light detector 401 is fixed to the focus 302 of the ellipse curved-surface reflection device 300.

Referring to FIG. 7A, assuming the light emitted from the light source 704 is the laser beam 705. The laser beam 705 is not used for limiting the disclosure, which can also be a light beam emitted from a single-wavelength light source or a multi-wavelength light source, for example, a light-emitting diode (LED), an incandescent light source, or other types of the light source, etc. The laser beam 705 is focused by the light focusing device 706 to form the laser beam 402. The laser beam 402 irradiates the object 30, which may represent a laser processing operation, namely, the surface of the object 30 is processed by the focused laser beam 402, wherein the object 30 is disposed on a platform 40 to keep stable during the processing. During the processing, the object 30 is horizontally moved along an X-axis or a Y-axis (not shown), though the point to be processed on the surface of the object 30 has to be located at the focus 301 for being correctly processed. When the laser beam 402 is correctly focused on the surface of the object 30 (i.e. when the focus 301 is located at the surface of the object 30), the reflected light beams or scattered light beams thereof can be again focused to the focus 302, and therefore the detection result thereof is as that shown in FIG. 6A, and the laser beam 402 can correctly perform the processing to the surface of the object 30.

If the laser beam 402 is focused below the surface of the object 30 (i.e., the object 30 is in the front focus state), the reflected light beams or scattered light beams thereof cannot be focused to the focus 302, which represents that the laser beam 402 cannot correctly perform the processing to the surface of the object 30. Now, the detection result is as that shown in FIG. 6B, and the position of the peak 602' of the light intensity distribution is located at the top of the figure, which represents that the focus position of the laser beam 402 is required to be moved upwards. The data processing unit 701 can generate the control signal to the actuator 702 according to a current detection result. Next, the actuator 702 generates the driving signal to the adjustment unit 703 according to the control signal, so that the adjustment unit 703 can adjust a position of the light focusing device 706. Now, the adjustment unit 703 can simultaneously move the light focusing device 706, the ellipse curved-surface reflection device 300 and the light detector 401 upwards along the Z-axis, so as to move the focus position of the laser beam 402 upwards to the surface of the object 30. Wherein, a shifting amount of the light focusing device 706, the ellipse curved-surface reflection device 300 and the light detector 401 directly relates to the size of the light type 601'. Namely, the greater the size of the light type 601' is, the greater the shifting amount of the light focusing device 706, the ellipse curved-surface reflection device 300 and the light detector 401 is.

If the laser beam 402 is focused above the surface of the object 30 (i.e., the object 30 is in the back focus state), the reflected light beams or scattered light beams thereof cannot be focused to the focus 302, which also represents that the laser beam 402 cannot correctly perform the processing to the surface of the object 30. Now, the detection result is as that shown in FIG. 6C, and the position of the peak 602' of the light intensity distribution is located at the bottom of the figure, which represents that the focus position of the laser beam 402 is required to be moved downwards. The data processing unit 701 also generates the control signal to the actuator 702 according to the current detection result. Next, the actuator 702 generates the driving signal to the adjustment unit 703 according to the control signal, so that the adjustment unit 703 can adjust the positions of the light focusing device 706, the ellipse curved-surface reflection device 300 and the light detector 401. Now, the adjustment unit 703 can simultaneously move the light focusing device 706, the ellipse curved-surface reflection device 300 and the light detector 401 downwards along the Z-axis, so as to move the focus position of the laser beam 402 downwards to the surface of the object 30. Wherein, a shifting amount of the light focusing device 706, the ellipse curved-surface reflection device 300 and the light detector 401 also directly relates to the size of the light type 601".

In other embodiments, the data processing unit 701 and the actuator 702 can be integrated, which can also process the detection result and drive the adjustment unit 703 according to the detection result, so as to adjust the focus position of the light beam 402.

Figure 7B:
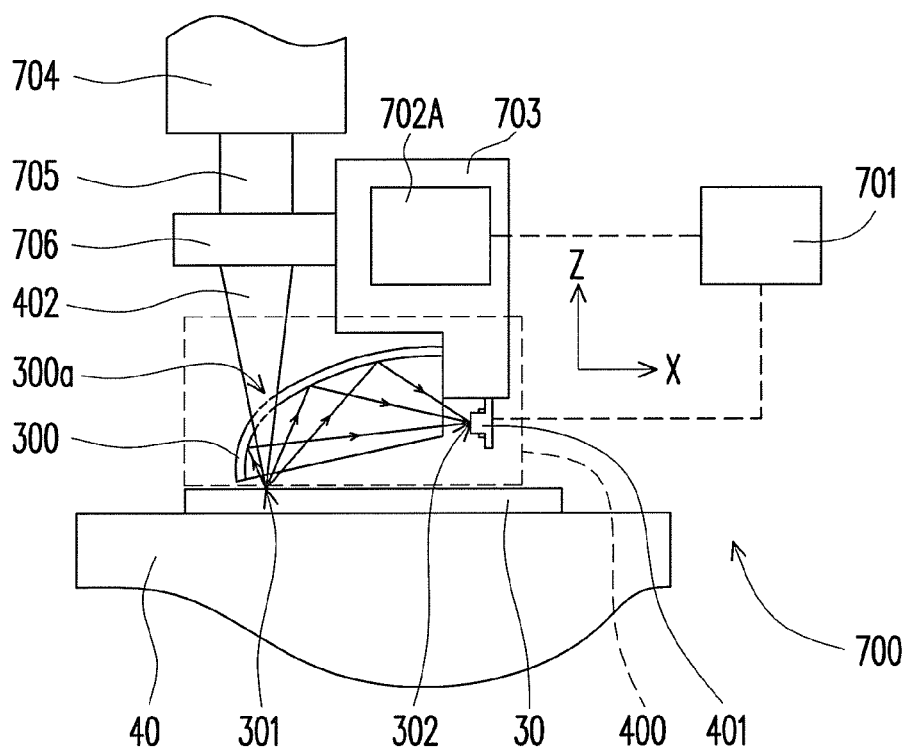

Referring to FIG. 7B, FIG. 7B is a structural diagram illustrating another focusing apparatus 700 according to the embodiment of FIG. 4. A difference between the focusing apparatus 700 and that of FIG. 7A is that the actuator 702 is integrated to the adjustment unit 703. The data processing unit 701 generates the control signal according to the detection result, and transmits it to the actuator 702A within the adjustment unit 703. Next, the actuator 702 controls the adjustment unit 703 according to the control signal to adjust the positions of the light focusing device 706, the ellipse curved-surface reflection device 300 and the light detector 401.

Figure 7C:
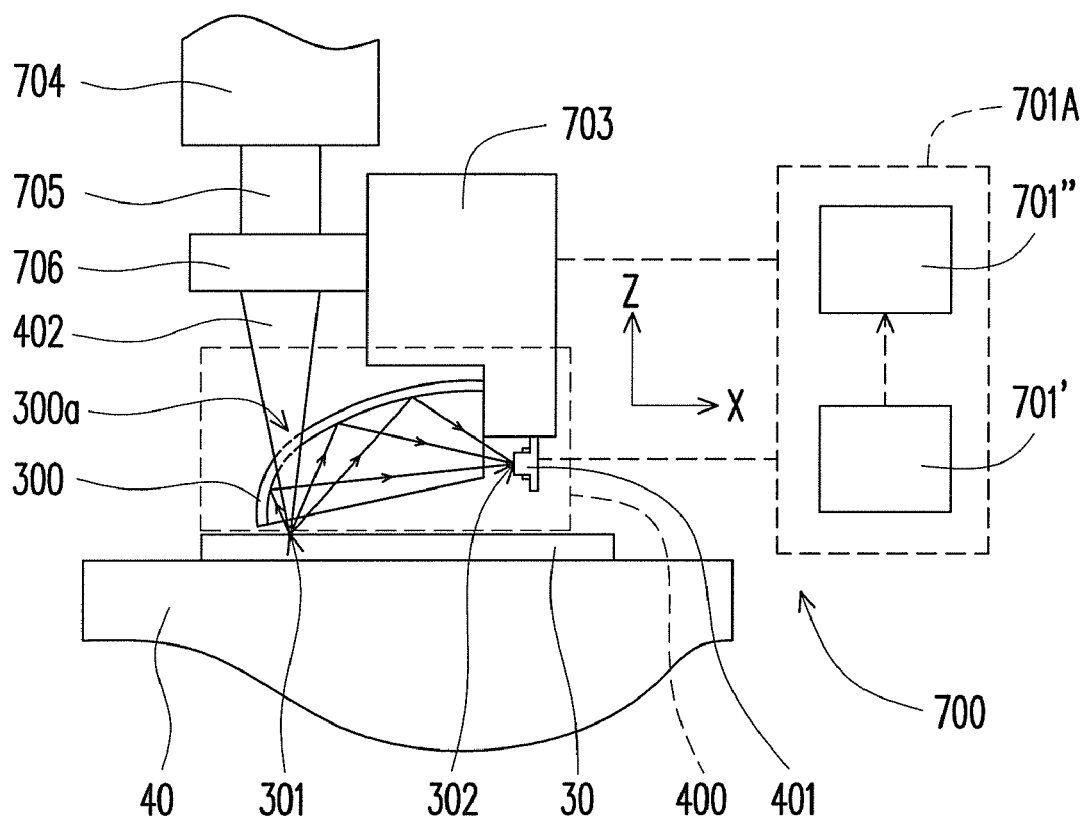

Referring to FIG. 7C, FIG. 7C is a structural diagram illustrating still another focusing apparatus 700 according to the embodiment of FIG. 4. A difference between the focusing apparatus 700 and that of FIG. 7A is that the data processing unit is integrated to the actuator. Namely, a control device 701A includes a data processing unit 701' and an actuator 701". The data processing unit 701' generates the control signal to the actuator 701" according to the detection result. Next, the actuator 701" generates the driving signal to the adjustment unit 703 according to the control signal, so that the adjustment unit 703 can adjust the positions of the light focusing device 706, the ellipse curved-surface reflection device 300 and the light detector 401.

Figure 8:
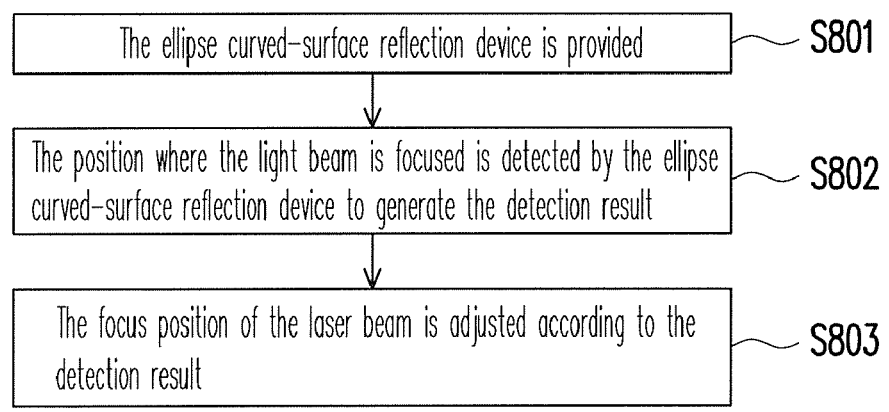
FIG. 8 is a flowchart illustrating a method of focus according to an embodiment of the disclosure.

According to another aspect, the disclosure provides a method of focus, which is applied to the focusing apparatus 700. FIG. 8 is a flowchart illustrating a method of focus according to an embodiment of the disclosure. Referring to FIG. 8, first, in step S801, the ellipse curved-surface reflection device is provided. Next, in step S802, the position where the light beam is focused is detected by the ellipse curved-surface reflection device to generate the detection result, wherein the detection result is provided by the light detector, and includes the peak of the light intensity distribution and the size of the light type, by which the defocus state between the light focusing device and the object to be detected is judged. Finally, in step S803, the adjustment unit can adjust the position of the light focusing device according to the driving signal, so as to adjust the focus position of the laser beam.

Furthermore, in the step S803, if the detection result represents that the focus position is on the surface of the object, the focus position of the light beam is not adjusted. Moreover, if the detection result represents that the focus position of the light beam is located behind the surface of the object, the focus position of the light beam is then moved towards the light source, so as to adjust the focus position of the light beam to the surface of the object. Alternatively, if the detection result represents that the focus position of the light beam is located in front of the surface of the object, the focus position of the light beam is then moved apart from the light source, so as to adjust the focus position of the light beam to the surface of the object.

In summary, in the disclosure, light beam reflected or scattered by the surface of the object to be detected is reflected by the ellipse curved-surface reflection device, and the reflected or the scattered light beam is received by the light detector to generate the detection result. Then, whether the light beam is correctly focused to a point on the surface of the object is judged according to the detection result. By such means, the focus position of the light beam is detected based on a simple structure, and a size of the detecting module and a cost thereof are reduced.

It will be apparent to those skilled in the art that various modifications and variations can be made to the structure of the disclosure without departing from the scope or spirit of the invention. In view of the foregoing, it is intended that the disclosure cover modifications and variations of this invention provided they fall within the scope of the following claims and their equivalents.

What is claimed is:

1. A detecting module, adapted to detect a focus position of a focused light beam projected to a surface of an object to be detected, the detecting module comprising:
   an reflection device with an ellipse curved-surface, the reflection device having a beam gate, wherein the focused light beam is projected to the surface of the object to be detected through the beam gate to generate a reflected light beam and a scattered light beam,
   wherein the reflection device has a first focus and a second focus, wherein the first focus is coincident to a focus of the focused light beam, the first focus and the second focus are two conjugate foci of the ellipse curved-surface of the reflection, device; and
   a light detector, located at the second focus, used for detecting the reflected light beam and the scattered light beam reflected by the reflection device to generate a detecting result, and the focus position of the focused light beam being adjusted according to the detecting result, so that the focus position falls on the surface of the object to be detected.

2. The detecting module as claimed in claim 1, wherein the light detector detects a light signal and a light pattern of the reflected light beam or the scattered light beam, and obtains a distance between the focus of the focused light beam and the surface of the object by comparing the light signal and the light pattern, wherein the distance is equal to or greater than zero.

3. The detecting module as claimed in claim 2, wherein when the distance is greater than zero, the focus of the focused light beam falls on the surface of the object by adjusting the focus position of the focused light beam.

4. The detecting module as claimed in claim 1, wherein the light detector comprises a photoelectric position sensitive device (PSD), a charge-coupled device (CCD), a complementary metal-oxide-semiconductor (CMOS) device, a photon diode device or a photon diode array.

5. An automatic focusing apparatus, comprising:
   a light focusing device, focusing a detecting light beam into a focused light beam having a focus, and the focused light beam being projected to an object to be detected to generate a reflected light beam and a scattered light beam;
   a light detector, for detecting a light signal;
   an reflection device with an ellipse curved-surface, the reflection device having a beam gate, disposed between the light focusing device and the object to be detected for enabling the focused light beam to the object to be detected through the beam gate, wherein the reflection device guiding the reflected light beam and the scattered light beam scattered by the object to be detected to the light detector;
   an adjustment unit, respectively coupled to the light focusing device, the ellipse curved-surface reflection device and the light detector, and is capable of simultaneously moving the three devices towards a same direction;
   an actuator, coupled to the adjustment unit, for generating a driving signal to the adjustment unit according to a control signal; and
   a data processing device, coupled to the light detector and the actuator, for analysing a signal received by the light detector to determine whether the object to be detected is defocused, meanwhile, the data processing device also computing a control signal with a defocus state required to be modified, and transmitting the control signal to the actuator.

6. The automatic focusing apparatus as claimed in claim 5, wherein the ellipse curved-surface reflection device has a first focus and a second focus, meanwhile, the first focus of the reflection device is coincident to the focus of the focused light beam.

7. The automatic focusing apparatus as claimed in claim 5, wherein the light detector is located at the second focus of the reflection device.

8. The automatic focusing apparatus as claimed in claim 5, wherein the adjustment unit comprises a motor coupled to the light focusing device, the reflection device and the light detector, and capable of simultaneously moving the three devices towards a same direction.

9. The automatic focusing apparatus as claimed in claim 5, wherein the adjustment unit comprises a set of motors respectively coupled to the light focusing device, the reflection device and the light detector, and capable of simultaneously moving the three devices towards a same direction.

10. The automatic focusing apparatus as claimed in claim 5, wherein the light detector comprises a photoelectric position sensitive device (PSD), a charge-coupled device (CCD), a complementary metal-oxide-semiconductor (CMOS) device, a photon diode or a photon diode array.

11. The automatic focusing apparatus as claimed in claim 5, wherein an internal curved-surface of the reflection device has a highly reflective layer to improve a reflectivity of the ellipse curved-surface reflection device.

12. The automatic focusing apparatus as claimed in claim 5 further comprising a gas control device for removing dust particles.

13. The automatic focusing apparatus as claimed in claim 12, wherein the gas control device further comprises a blowing apparatus and an exhausting apparatus for removing the dust particles.

14. The automatic focusing apparatus as claimed in claim 5, wherein the control signal is a digital signal or an analog signal.

15. A method of focus, comprising:
   focusing a detecting light beam into a focused light beam having a focus, and projecting the focused light beam to an object to be detected to generate a reflected light beam and a scattered light beam; and
   guiding the reflected light beam and the scattered light beam to a first focus of an ellipse curved-surface based on reflection of the ellipse curved-surface, and generating a sensing signal after the reflected light beam and the scattered light beam are sensed by a light detector located at a position of a second focus of the ellipse curved-surface, wherein the first focus and the second focus are two conjugate foci of the ellipse curved-surface, wherein whether the focus of the focused light beam is located on a surface of the object where the focused light beam is projected is judged according to the sensing signal.

16. The method of focus as claimed in claim 15, wherein the sensing signal is a light signal and a light pattern of the reflected light beam or the scattered light beam, and a distance between the focus of the focused light beam and the surface of the object where the focused light beam is projected is obtained by comparing the light signal and the light pattern, wherein the distance is equal to or greater than zero.

17. The method of focus as claimed in claim 16, wherein the light signal comprises a light intensity distribution of the reflected light beam and the scattered light beam, and whether the focus of the focused light beam falls on the surface of the object where the focused light beam is projected is determined by comparing a peak of the light intensity distribution and the light pattern.

18. The method of focus as claimed in claim 16, wherein when the distance is greater than zero, the focus of the focused light beam is capable of falling on the surface of the object where the focused light beam is projected by adjusting a position of the focus of the focused light beam.

* * * * *